(12) United States Patent
Kurabayashi et al.

(10) Patent No.: US 7,258,793 B2
(45) Date of Patent: Aug. 21, 2007

(54) METHOD AND APPARATUS FOR TREATING ORGANIC LIQUID WASTE

(75) Inventors: Katsuji Kurabayashi, Hachiouji (JP);
Ikuo Hoshino, Hachiouji (JP);
Yoshihiro Kikka, Hachiouji (JP);
Masaya Iwamoto, Hachiouji (JP)

(73) Assignee: Oki Electric Industry Co., Ltd., Minato-ku, Tokyo (JP)

( * ) Notice: Subject to any disclaimer, the term of this patent is extended or adjusted under 35 U.S.C. 154(b) by 209 days.

(21) Appl. No.: 11/186,766

(22) Filed: Jul. 22, 2005

(65) Prior Publication Data

US 2006/0060528 A1    Mar. 23, 2006

(30) Foreign Application Priority Data

Sep. 17, 2004    (JP)    ............... 2004-270836

(51) Int. Cl.
*C02F 3/06*    (2006.01)
(52) U.S. Cl. .................. 210/617; 210/620; 210/150
(58) Field of Classification Search ................ 210/150, 210/151, 615, 617, 620
See application file for complete search history.

(56) References Cited

U.S. PATENT DOCUMENTS

| | | | | |
|---|---|---|---|---|
| 3,269,542 A | * | 8/1966 | Renzi et al. | 210/151 |
| 3,968,035 A | * | 7/1976 | Howe | 210/621 |
| 4,192,742 A | * | 3/1980 | Bernard et al. | 210/150 |
| 4,921,604 A | * | 5/1990 | Moellenbeck | 210/151 |
| 5,240,600 A | * | 8/1993 | Wang et al. | 210/615 |
| 5,961,830 A | * | 10/1999 | Barnett | 210/151 |
| 2003/0226805 A1 | * | 12/2003 | Chi et al. | 210/617 |

FOREIGN PATENT DOCUMENTS

JP    05-261394 A    10/1993

* cited by examiner

*Primary Examiner*—Christopher Upton
(74) *Attorney, Agent, or Firm*—Volentine & Whitt, PLLC

(57) ABSTRACT

In a method and apparatus for treating an organic liquid waste with a biofilm, the organic liquid waste is dissolved with oxygen under a first pressure higher than an atmospheric pressure to prepare a pressurized oxygen-dissolved organic liquid waste. The pressurized oxygen-dissolved organic liquid waste is depressurized to prepare a depressurized oxygen-dissolved organic liquid waste. The depressurized oxygen-dissolved organic liquid waste contacts the biofilm to prepare a treated organic liquid waste.

29 Claims, 7 Drawing Sheets

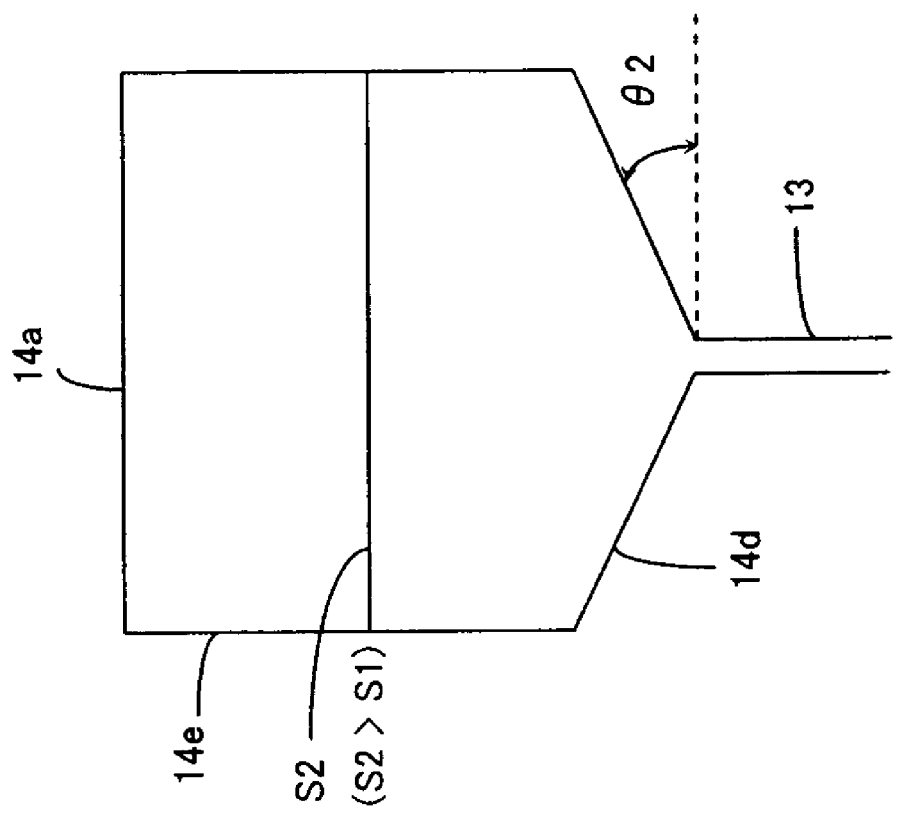
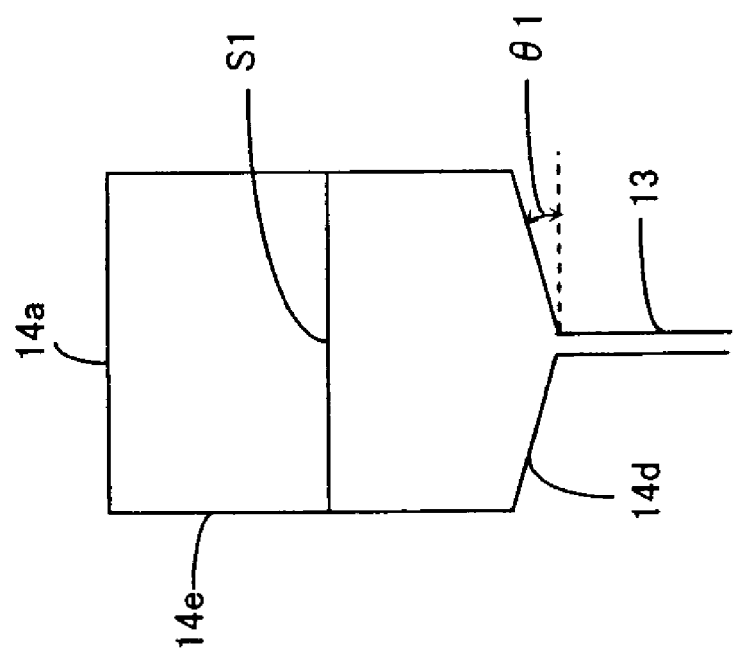

METHOD AND APPARATUS FOR TREATING ORGANIC LIQUID WASTE

CROSS-REFERENCE TO RELATED APPLICATIONS

This application claims priority to Japanese Patent Application No. 2004-270836, the entire disclosure of which is herein incorporated by reference.

BACKGROUND OF THE INVENTION

1. Field of the Invention

The present invention generally relates to a method and an apparatus for treating organic liquid waste. More specifically, the present invention relates to a method and an apparatus for treating organic liquid waste using a biofilm.

2. Background Information

All of patents, patent applications, patent publications, scientific articles, and the like, which will hereinafter be cited or identified in the present application, will hereby be incorporated by references in their entirety in order to describe more fully the state of the art to which the present invention pertains.

Organic-based liquid waste (hereinafter referred to as an organic liquid waste) is usually treated by an available method so that the treated liquid waste satisfies predetermined emission regulations before the treated liquid waste is then emitted from a factory. The term "organic liquid waste" is defined to be a liquid-state waste including at least one organic-based matter. A typical example of the organic liquid waste may include, but is not limited to, organic wastewater. The predetermined emission regulations include Biochemical Oxygen Demand (hereinafter referred to as BOD). BOD is a measure of the quantity of oxygen consumed by microorganisms such as aerobic bacteria during decomposition of organic matter in water. BOD may also be an index of water pollution. A higher level of BOD represents higher level of pollution in the water. A BOD component is a substance or matter that is subject to oxidation and decomposition by microorganisms, and is included in the organic liquid waste.

The BOD component in the organic liquid waste such as isopropyl alcohol (IPA) and tetramethyl ammonium hydroxide (TMAH) emitted in semiconductor manufacturing processes is oxidized and decomposed by a biofilm method and then discharged from the factory. In accordance with the biofilm method, the BOD component is oxidized and decomposed by a film of aerobic microorganisms that are adhered on a surface of a fixed bed in a reactor. The aerobic microorganisms consume oxygen to decompose the organic matter in the waste. It has been known that air-distribution manifolds are provided in the reactor for supplying oxygen to the aerobic microorganisms.

Japanese Laid-Open Patent Publication No. 5-261394 discloses a conventional method for treating the organic liquid waste. The conventional method utilizes a reservoir vessel, a wet catalyst tower for oxidation, a neutralization vessel, and a high pressure biofiltration vessel for treatment of the organic liquid waste.

The organic liquid waste is introduced into the reservoir vessel. The waste is then fed by a pump to the wet catalyst tower through a first feeding pipe, which connects the reservoir vessel to the wet catalyst tower. The pipe has a half-way connecting portion which is connected with a supplying pipe for supplying an oxygen-containing gas which has been pressurized by a compressor. The waste on the feeding through the pipe is mixed with the pressurized oxygen-containing gas at the half-way connecting portion. The wet catalyst tower has a catalyst bed which is formed by filling a catalyst into a high pressure container. The waste flows through the catalyst bed at a high temperature and under a high pressure, whereby the waste is oxidized. The oxidized waste is then subjected to pH-adjustment in the neutralization vessel. The pH-adjusted waste is then fed to the biofiltration vessel. The biofiltration vessel has a second feeding pipe for feeding the oxidized waste. The biofiltration vessel also has air-distribution manifolds. The biofiltration vessel further has a holder for holding particle-carriers that support microorganisms.

The oxidized waste is introduced through the second feeding pipe into the high pressure biofiltration vessel. The oxidized waste flows in proximity to the particle-carriers with a flow of the air supplied through the air-distribution manifolds. The oxidized waste is treated and filtrated with aerobic microorganisms in the form of a biofilm adhered on a surface particle-carriers, thereby removing the BOD component and CODCr component from the waste. COD means Chemical Oxygen Demand. The biofilm method feeds an organic matter to aerobic microorganisms for growth and multiplication thereof. The activity of microorganisms depends on oxygen, humidity, and nutrition. This means that the capacity of the organic liquid waste treatment apparatus depends on oxygen, humidity, and nutrition. Under atmospheric pressure, 8.8 mg/L of oxygen, which is fed to aerobic microorganisms, is dissolved in pure water. 8.8 mg/L is a maximum concentration at 20° C. A preferable temperature range for aerobic microorganisms to exhibit highest biological activity depends on the types or species of microorganisms. For example, 30-40° C. is preferable. Nitrogen and phosphorous as nutrition are supplied to the aerobic microorganisms at weight ratios of BOD:N:P=100:5:1.

The conditions for oxidation-decomposition reactions by the aerobic microorganisms include an amount of oxygen, humidity, and nutrition. The three conditions are important for the aerobic microorganisms to exhibit higher biological activity. In the conventional biofilm method, oxygen is dissolved in the organic liquid waste under atmospheric pressure. However, just 5-6% of oxygen can be dissolved in the organic liquid waste. Lower concentrations of oxygen dissolved in the organic liquid waste cause the aerobic microorganisms to exhibit lower biological activity.

In accordance with the conventional biofilm method, 1 $m^3$ of the biofilm decomposes approximately 1-2 kg of the BOD component per day even if the temperature and the nutrition are optimized. No higher efficiency of the decomposition can be obtained using a conventional biofilm method. A large scale biofilm reactor is required for containing a large amount of microorganisms. A large space is thus required for installing the reactor.

The conventional method disclosed in the above-mentioned Japanese publication is to oxidize the organic liquid waste with a wet catalyst at a high temperature under a high pressure before the biofilm reactor decomposes the BOD component, which mainly includes a residual organic acid having a low molecular weight. Not only the biofiltration chamber but the wet catalyst tower is required, which shares a large area and requires a high cost.

Air is introduced into the biofilm reactor through the air-distribution manifolds. A uniform supply of oxygen throughout an inner space of the biofilm reactor requires a number of the air-distribution manifolds provided in the biofilm reactor. Each of the air-distribution manifolds has plural oxygen-injection holes that are aligned along an air stream direction. This makes it difficult to realize a desired uniform injection of oxygen from the plural oxygen-injection holes.

Further, sludge of dead microorganisms may block some of the oxygen-injection holes, resulting in a non-uniform oxygen supply to the reactor. This causes a variation in biological activity of microorganisms with a position in the inner space of the reactor. The variation drops the total efficiency of oxidation-decomposition by the biofilm.

In view of the above, it will be apparent to those skilled in the art from this disclosure that there exists a need for an improved a method and an apparatus for treating an organic liquid waste. This invention addresses this need in the art as well as other needs, which will become apparent to those skilled in the art from this disclosure.

SUMMARY OF THE INVENTION

In accordance with a first preferred aspect of the present invention, an apparatus for treating organic liquid waste includes a first dissolving mechanism and a first reactor. The first dissolving mechanism is configured to dissolve the organic liquid waste with oxygen under a first pressure higher than atmospheric pressure to prepare a pressurized oxygen-dissolved organic liquid waste. The first reactor is mechanically coupled to the first dissolving mechanism to receive the pressurized oxygen-dissolved organic liquid waste from the first dissolving mechanism. The first reactor has a biofilm. The first reactor is configured to depressurize the pressurized oxygen-dissolved organic liquid waste to prepare a depressurized oxygen-dissolved organic liquid waste. The first reactor is also configured to make the depressurized oxygen-dissolved organic liquid contact the biofilm to prepare a treated organic liquid waste.

In accordance with a second aspect of the present invention, a method for treating organic liquid waste with a biofilm includes the steps of: dissolving the organic liquid waste with oxygen under a first pressure higher than atmospheric pressure to prepare a pressurized oxygen-dissolved organic liquid waste; depressurizing said pressurized oxygen-dissolved organic liquid waste to prepare a depressurized oxygen-dissolved organic liquid waste; and contacting said depressurized oxygen-dissolved organic liquid waste with said biofilm to prepare a treated organic liquid waste.

Other objects and further features of the present invention will be apparent from the following descriptions accompanying drawings and from the detailed description which follows.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4A is a schematic cross-sectional elevational view illustrating a first relationship between a horizontally sectioned area of the reactor chamber and a sloped angle of the bottom of the reactor chamber of FIG. 3;

FIG. 4B is a schematic cross-sectional elevational view illustrating a second relationship between a horizontally sectioned area of the reactor chamber and a sloped angle of the bottom of the reactor chamber of FIG. 3;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Configuration

Figure 1:
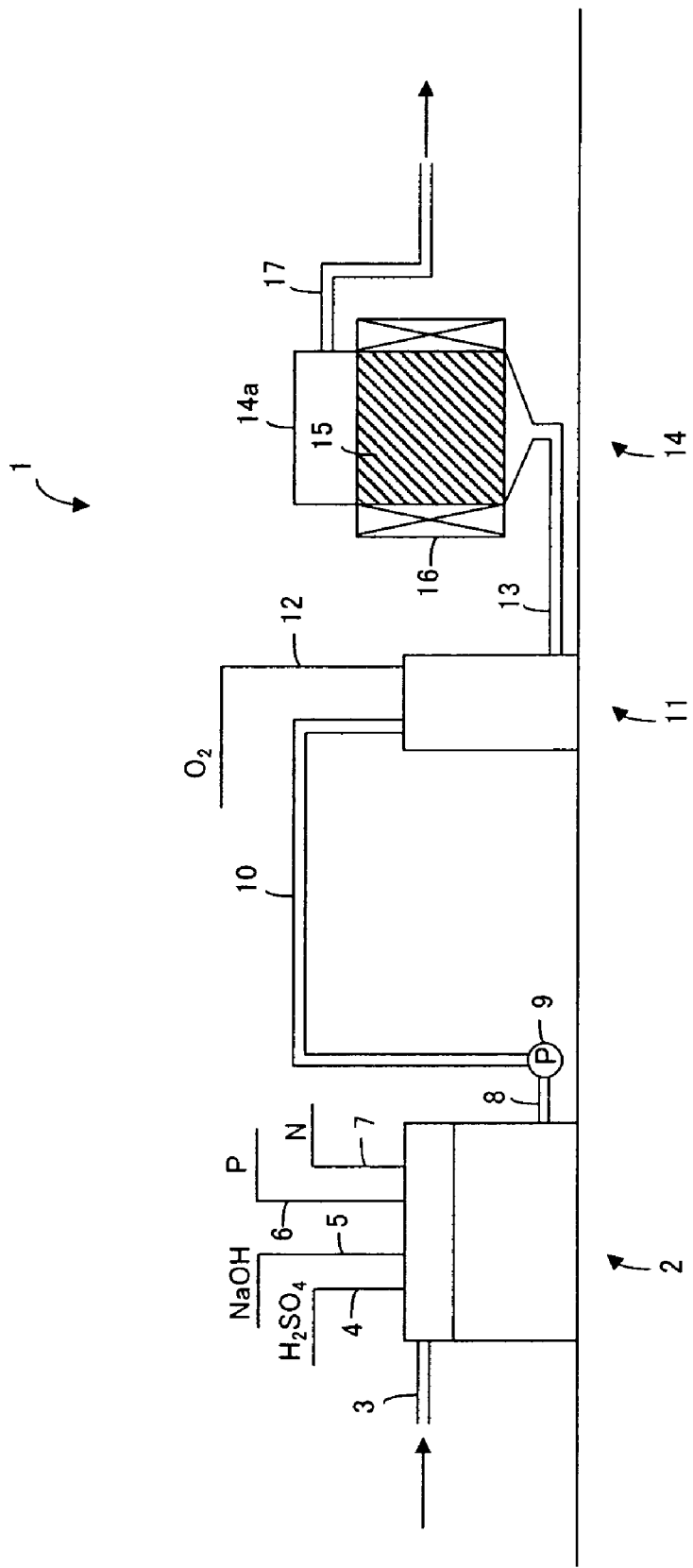
FIG. 1 is a view of a schematic diagram illustrating a configuration of an organic liquid waste treatment apparatus in accordance with a first preferred embodiment of the present invention.

FIG. 1 is a schematic diagram illustrating a configuration of an organic liquid waste treatment apparatus 1 in accordance with a first preferred embodiment of the present invention. The organic liquid waste treatment apparatus 1 includes an adjusting vessel 2, a high pressure oxygen dissolving vessel 11, and a biofilm reactor 14.

The adjusting vessel 2 is configured to adjust a pH-value of an organic liquid waste and supplies nutrition thereto. The organic liquid waste is introduced from a reservoir vessel that is not illustrated. The reservoir vessel is configured to hold untreated organic liquid waste just emitted from one or more manufacturing equipments in a factory.

The adjusting vessel 2 is connected with first and second feeding pipes 3 and 8 and first to fourth introducing pipes 4-7. The first feeding pipe 3 is connected to the reservoir vessel, which holds the untreated organic liquid waste. The first feeding pipe 3 feeds the untreated organic liquid waste from the reservoir vessel to the adjusting vessel 2. The first introducing pipe 4 introduces an acidic solution such as $H_2SO_4$ into the adjusting vessel 2 for adjusting the pH-value of the organic liquid waste in the adjusting vessel 2. The second introducing pipe 5 introduces an alkali solution such as NaOH into the adjusting vessel 2 to adjust the pH-value of the organic liquid waste in the adjusting vessel 2. The organic liquid waste in the adjusting vessel 2 is subject to a pH-value adjustment before the pH-adjusted organic liquid waste is fed to the biofilm reactor 14 and allows multiplication of microorganisms. The third introducing pipe 6 preferably introduces phosphorous (P) into the adjusting vessel 2. The fourth introducing pipe 7 preferably introduces nitrogen (N) into the adjusting vessel 2. Proper amounts of phosphorous (P) and nitrogen (N) are introduced into the adjusting vessel 2 as nutrition for microorganisms in the biofilm reactor 14. The proper amounts are determined so that the microorganisms efficiently oxidize and decompose the organic liquid waste. Preferable weight ratios of phosphorous (P) and nitrogen (N) to BOD are BOD:N:P=100:5:1. The introducing amounts of phosphorous (P) and nitrogen (N) may be adjusted by taking into account the composition of the liquid waste and the species of microorganisms in the biofilm reactor 14.

The adjusting vessel 2 is also connected through the second feeding pipe 8 to a pump 9. The pump 9 is further connected through a third feeding pipe 10 to the high pressure oxygen dissolving vessel 1. The pH-adjusted nutrition-containing organic liquid waste is fed through the second feeding pipe 8 to the pump 9. The pump 9 pressurizes the pH-adjusted nutrition-containing organic liquid waste and feeds the pressurized pH-adjusted nutrition-containing organic liquid waste through the third feeding pipe 10 to the high pressure oxygen dissolving vessel 11.

The high pressure oxygen dissolving vessel 11 is configured to dissolve, under a high pressure, oxygen in the pressurized pH-adjusted nutrition-containing organic liquid waste that has been supplied from the adjusting vessel 2. The high pressure oxygen dissolving vessel 11 is connected with a fifth introducing pipe 12, which is further connected to a compressor that is not illustrated. The compressor pressurizes an oxygen-containing gas up to a high pressure in the range of 0.06-0.08 MPa. The fifth introducing pipe 12 introduces a pressurized oxygen-containing gas into the high pressure oxygen dissolving vessel 11. The high pressure oxygen dissolving vessel 11 dissolves the pressurized pH-adjusted nutrition-containing organic liquid waste with oxygen that is contained in the pressurized oxygen-containing gas under a high pressure. Namely, oxygen is dissolved in the organic liquid waste that has been pH-adjusted and contains nutrition at the high pressure. The high pressure oxygen dissolving vessel 11 is also connected through a fourth feeding pipe 13 to the biofilm reactor 14. The fourth feeding pipe 13 feeds the oxygen-dissolved organic liquid waste to the biofilm reactor 14.

As described above, the pH-adjusted nutrition-containing organic liquid waste is fed from the adjusting vessel 2 through the second feeding pipe 8 to the pump 9 where the pH-adjusted nutrition-containing organic liquid waste is pressurized up to approximately 0.05 MPa. The pressurized pH-adjusted nutrition-containing organic liquid waste is further fed through the third feeding pipe 10 to the high pressure oxygen dissolving vessel 11. The pressurized oxygen-containing gas is also supplied through the fifth introducing pipe 12 to the high pressure oxygen dissolving vessel 11. The high pressure oxygen dissolving vessel 11 has a pressure that is adjusted based on both the pressures of the organic liquid waste and the pressurized oxygen-containing gas. The pressure is also adjusted based on an opening degree of a discharge valve provided at a joint between the high pressure oxygen dissolving vessel 11 and the fourth feeding pipe 13. The pressurized oxygen-containing gas is higher in pressure than the organic liquid waste.

The high pressure oxygen dissolving vessel 11 also has a spray to spray the organic liquid waste into the pressurized oxygen-containing gas so that oxygen contained in the pressurized oxygen-containing gas is dissolved in the organic liquid waste under the high pressure. The higher pressure of the high pressure oxygen dissolving vessel 11 leads to an increased amount or concentration of oxygen dissolved in the organic liquid waste. Typical examples of the oxygen-containing gas may include, but are not limited to, air, a pure oxygen gas and other oxygen-containing gases available. In other words, the high pressure oxygen dissolving vessel 11 is configured to generate the pressurized oxygen-dissolved organic liquid waste. The pressurized oxygen-dissolved organic liquid waste is then fed through the fourth feeding pipe 13 to the biofilm reactor 14.

The biofilm reactor 14 is configured to depressurize the pressurized oxygen-dissolved organic liquid waste to an atmospheric pressure to cause a vaporization of a large amount of oxygen in the depressurized oxygen-dissolved organic liquid waste so that the vaporized oxygen gas and the nutrition, which remains contained in the depressurized organic liquid waste, are supplied to microorganisms in the form of a biofilm in the biofilm reactor 14. The microorganisms oxidize and decompose the BOD component of the organic liquid waste.

The biofilm reactor 14 further includes a reactor chamber 14a, a biofilm holder 15, and a heater 16. The biofilm holder 15 is provided in the reactor chamber 14a to hold the biofilms, each of which has a colony of the aerobic microorganisms. The heater 16 is provided adjacent to an outer wall of the reactor chamber 14a to control the temperature of the biofilm reactor 14 to allow the microorganisms to be highly activated. The heater 16 may have, but is not limited to, winding of a heating wire. The heater 16 is configured to heat the biofilm reactor 14 at an optimum temperature to enhance the biological activity of the aerobic microorganisms. The optimum temperature depends on the species of the microorganisms. The heater 16 adjusts the temperature of the biofilm reactor 14 to the optimum temperature. A typical example of the optimum temperature for this embodiment may be in the range of 30-40° C.

Figure 2B:
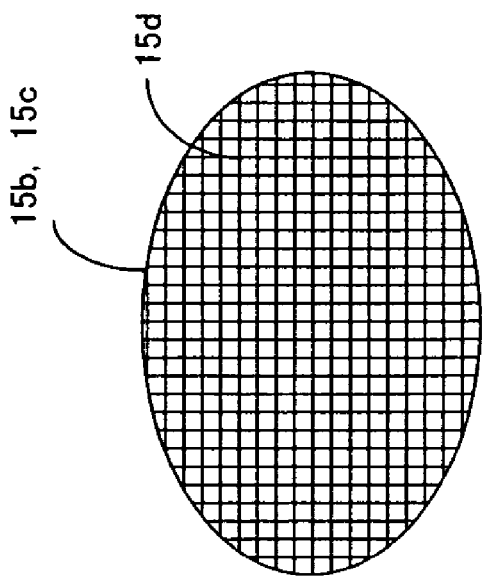
FIG. 2B is a plan view of a holder included in the biofilm reactor of FIG. 2A.
Figure 2A:
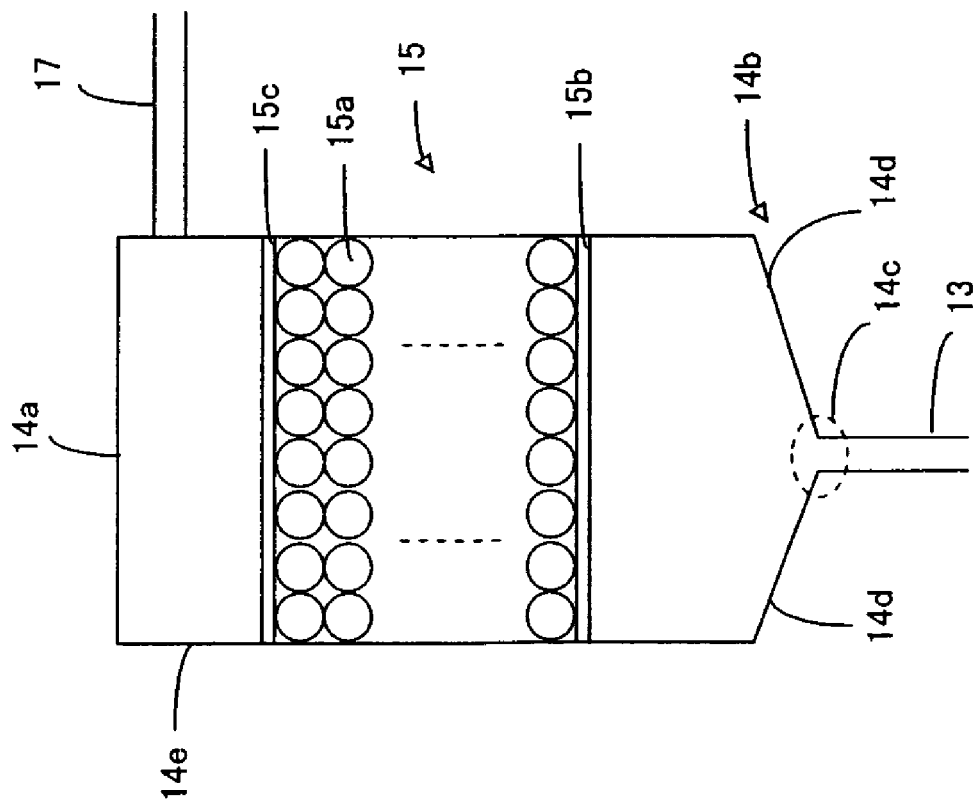
FIG. 2A is a fragmentary cross-sectional elevational view illustrative of a biofilm reactor included in the organic liquid waste treatment apparatus of FIG. 1.

FIG. 2A is a fragmentary cross sectional elevation view illustrative of the biofilm reactor 14 included in the organic liquid waste treatment apparatus 1 of FIG. 1. Illustration of the heater 16 is omitted in FIG. 2A. FIG. 2B is a plan view of the holder 15 included in the biofilm reactor 14 of FIG. 2A. The biofilm reactor 14 has a reactor chamber 14a that is cylindrically shaped. The reactor chamber 14a also has a flat top, a conical bottom 14b, and a cylindrically shaped side wall 14e. The conical bottom 14b further has a sloped or tapered portion 14d and a bottom center 14c. The bottom center 14c is further jointed with a downstream end of the fourth feeding pipe 13. The downstream end has an opening that faces upwardly and adjacent to the bottom center 14c. Therefore, the reactor chamber 14a has an inner space that communicates through the fourth feeding pipe 13 to the inner space of the high pressure oxygen dissolving vessel 11.

The reactor chamber 14a further has the biofilm holder 15 that includes a pair of lower and upper confiners 15b and 15c that hold a plurality of carriers 15a between them. The lower and upper confiners 15b and 15c are fixed to inner walls of the reactor chamber 14a. The lower and upper confiners 15b and 15c are distanced from each other with upper confiner 15c being near the flat top, and the lower confiner being near the conical bottom 14b. The paired lower and upper confiners 15b and 15c and the inner wall of the reactor chamber 14a completely confine the carriers 15a. As seen in FIG. 2B, each of the lower and upper confiners 15b and 15c may include, but not be limited to, a single meshed plate having penetration holes 15d that allow transmission of the organic liquid waste but inhibit transmission of each of the carriers 15a. The carrier 15a supports the microorganisms. The biofilm holder 15 is positioned above and vertically distanced from the conical bottom 14b of the reactor chamber 14a. The biofilm holder 15 is positioned below and vertically distanced from the flat top of the reactor chamber 14a. The cylindrically shaped side wall 14e of the reactor chamber 14a has an upper portion that is positioned above the biofilm holder 15 and below the flat top. The upper portion is further connected with a fifth feeding pipe 17 to discharge the organic liquid waste as treated with the microorganisms in the biofilm reactor 14.

The pressurized oxygen-dissolved organic liquid waste is then fed from the high pressure oxygen dissolving vessel 11 through the fourth feeding pipe 13 to the bottom center 14c of the reactor chamber 14a. The pressurized oxygen-dissolved organic liquid waste is then spread and depressurized by the sloped or tapered portion 14d of the reactor chamber 14a to cause the vaporization of oxygen in the depressurized oxygen-dissolved organic liquid waste. Namely, the sloped or tapered portion 14d causes an upward flow with a uniform spread of the organic liquid waste in the reactor chamber 14a. The upward flow of the organic liquid waste further penetrates the biofilm holder 15 so that the vaporized oxygen and the nutrition contained in the organic liquid waste are supplied to the microorganisms supported on the carriers 15a, while the microorganisms oxidize and decompose the BOD component of the organic liquid waste. After the organic liquid waste has been oxidized and decomposed with the microorganisms, then the decomposed or treated organic liquid waste is discharged through the fifth feeding pipe 17.

Figure 3:
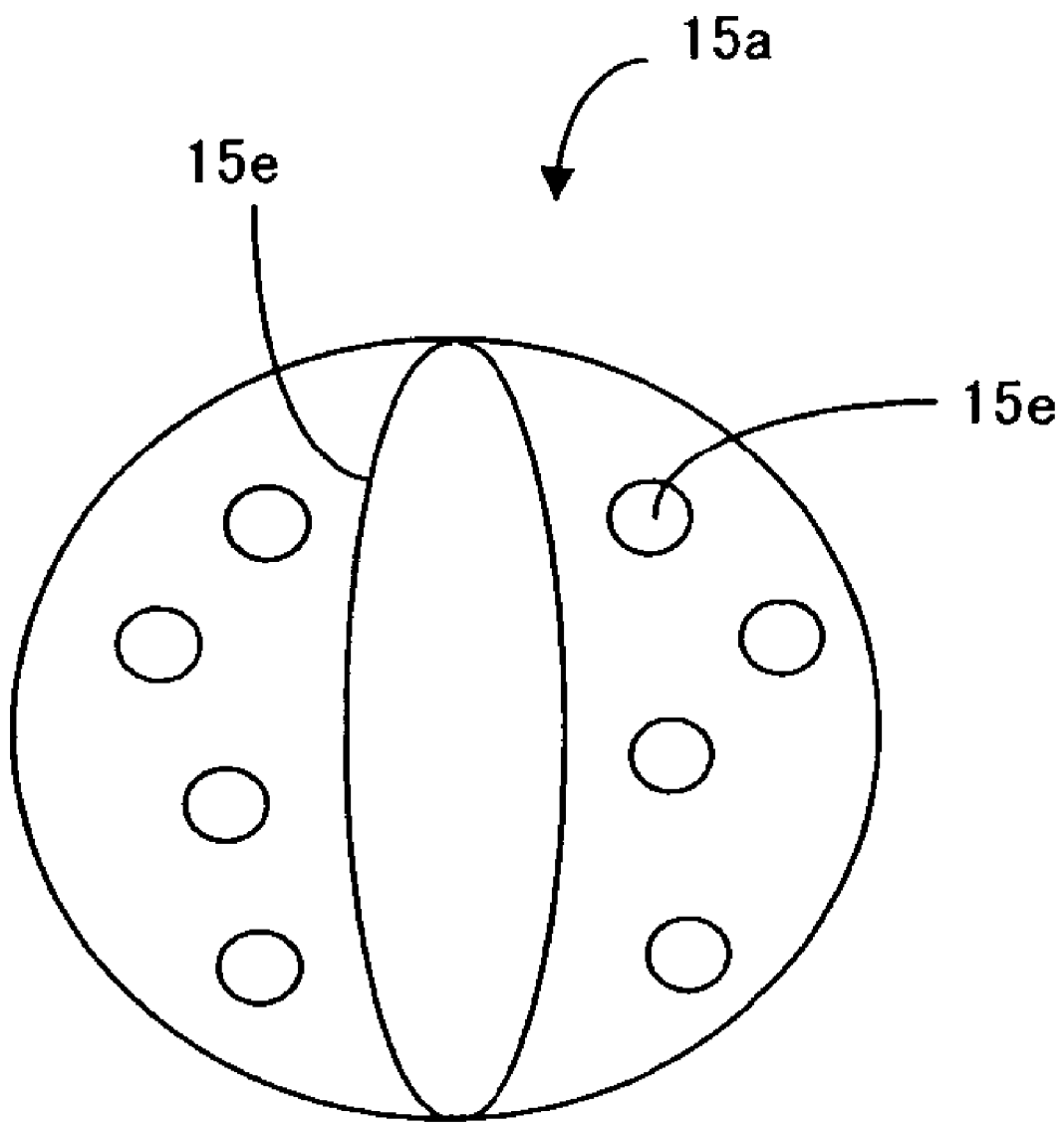
FIG. 3 is a schematic view of a shape of each carrier held in a reactor chamber of the biofilm reactor of FIG. 2A.

FIG. 3 is a schematic view of a shape of each of the carriers 15a held in the reactor chamber 14a shown in FIG. 2A. Each carrier 15a may include, but not be limited to, a spherically shaped Raschig-Ring made of a resin with a plurality of penetrating holes 15e. The carrier has inner and outer walls adhered with biofilms thereon. Each the biofilms has a colony of the aerobic microorganisms. The organic liquid waste flows upwardly and along the inner and outer walls of each of the plurality of carriers 15a. The above-described shape of each carrier 15a ensures a large contact area of the aerobic microorganisms with the upward flow of the organic liquid waste. The shape also improves the efficiency of oxidation and decomposition of the BOD component by the aerobic microorganisms.

FIG. 4A is a schematic cross sectional elevation view illustrating a first relationship between a horizontally sectioned area of the reactor chamber 14a and a sloped angle of the bottom of the reactor chamber 14a of FIG. 2A. FIG. 4B is a schematic cross-sectional elevation view illustrating a second relationship between a horizontally sectioned area of the reactor chamber and a sloped angle of the bottom of the reactor chamber 14a of FIG. 2A.

The reactor chamber 14a shown in FIG. 4A has a first horizontally sectioned area S1 and a first sloped angle θ1. The first horizontally sectioned area S1 is defined to be a horizontally sectioned area of the reactor chamber 14a except for the conical bottom 4b. The first sloped angle θ1 is defined to be a sloped angle of the sloped portion 14d from the horizontal direction. The reactor chamber 14a shown in FIG. 4B has a second horizontally sectioned area S2 and a second sloped angle θ2. The second horizontally sectioned area S2 is defined to be a horizontally sectioned area of the reactor chamber 14a except for the conical bottom 14b. The second sloped angle θ2 is defined to be a sloped angle of the sloped portion 14d from the horizontal direction. The second horizontally sectioned area S2 is larger than the first horizontally sectioned area S1. The second sloped angle θ2 is also larger than the first sloped angle θ1. The sloped angle is determined depending on the horizontally sectioned area on the following reasons. A large sloped angle of the sloped portion 14d causes a gentle spread of the organic liquid waste. A small sloped angle of the sloped portion 14d causes a rapid spread of the organic liquid waste. The sloped angle of the sloped portion 14d is determined to cause a uniform spread of the organic liquid waste to the inner space in the reactor chamber 14a.

It is significant that the reactor chamber 14a has a pressure that is sufficiently lower than the high pressure of the high pressure oxygen dissolving vessel 11 so that the pressurized organic liquid waste is rapidly depressurized upon entering into the reactor chamber 14a. This rapid depressurization decreases a saturation amount of oxygen in the organic liquid waste to generate a supersaturated oxygen component in the organic liquid waste. The supersaturated oxygen component is thus naturally vaporized by generating a large amount of highly fine foams of oxygen. The oxygen foams are also uniformly diffused or spread by the uniform spread of the organic liquid waste caused by the sloped portion 14d of the reactor chamber 14a. This allows supplying sufficient amounts of oxygen and nutrition to the microorganisms in the carriers 15a.

2. Effects:

2-1: Dissolved Oxygen Concentration

The following Table 1 shows concentrations of oxygen dissolved in the organic liquid waste under the atmospheric pressure and the high pressure.

TABLE 1

|  | Dissolved oxygen concentration |
| --- | --- |
| Air (atmospheric pressure) | 5–6 mg/L |
| Air (0.06 MPa) | 10.8 mg/L |
| Pure oxygen (0.06 MPa) | 34.6 mg/L |

The conventional apparatus uses the air-distribution manifolds. Under the atmospheric pressure, oxygen in the air is dissolved in the organic liquid waste at a lower concentration of 5-6 mg/L. The apparatus of the present invention uses the high pressure oxygen dissolving vessel 11 providing 0.06 MPa of pressure, under which oxygen in the pressurized air is dissolved in the organic liquid waste at a higher concentration of approximately 10.8 mg/L. Under the high pressure of 0.06 MPa, pure oxygen is dissolved in the organic liquid waste at a highest concentration of approximately 34.6 mg/L, which is higher by approximately five or six times than the above-described lower oxygen concentration obtained by using the air-distribution manifolds.

2-2: Supplying Biofilm with Oxygen:

In accordance with the conventional method, the air-distribution manifolds are used for generating fine foams of air for supplying oxygen included in the air foams to the organic liquid waste, so that when the organic liquid waste comes into contact with or proximity to the microorganisms, oxygen is supplied to the microorganisms. A uniform distribution or diffusion of oxygen to the inner space of the biofilm reactor 14 requires a plurality of the air-distribution manifolds provided in the biofilm reactor 14. Each of the manifolds has a plurality of holes that are aligned along an air stream through each manifold. Some holes are positioned closer to an upstream end of the manifold, while other holes are positioned closer to a downstream end thereof. The holes closer to the upstream end may allow more intensive injection of the air than the other holes closer to the downstream end. Further, blockage of some holes of each manifold with sludge of dead microorganisms may occur. This causes variation in injection of the air from the manifold.

In accordance with the present invention, the high pressure oxygen dissolving vessel 11 dissolves oxygen in the organic liquid waste under the high pressure to generate the pressurized oxygen-dissolved organic liquid waste, which is then fed through the fourth feeding pipe 13 to the biofilm reactor 14. The reactor chamber 14a has the atmospheric pressure that is sufficiently lower than the high pressure of the high pressure oxygen dissolving vessel 11 so that the pressurized oxygen-dissolved organic liquid waste upon entry into the reactor chamber 14a is rapidly depressurized in the reactor chamber 14a. The rapid depressurization decreases a saturation amount of oxygen in the organic liquid waste to generate a supersaturated oxygen component. The supersaturated oxygen component is then naturally vaporized by generating a large amount of highly fine foams of oxygen. The oxygen foams have smaller sizes than the holes 15e of each carrier 15a, thereby allowing the oxygen foams to enter into the inner space of each carrier 15a. The entered oxygen foams supply oxygen to the microorganisms in the form of the biofilm adhered on the inner wall of each carrier 15a. The other oxygen foams adjacent to the outer wall of each carrier 15a supply oxygen to the microorganisms in the form of the other biofilm adhered on the outer wall of each carrier 15a. The highly fine foams may reside in the organic liquid waste for such a long time that a sufficient amount of oxygen can be supplied to the microorganisms in the form of the biofilms. This allows the microorganisms to exhibit an enhanced biological activity to oxidize and decompose the BOD component.

The sloped portion 14d of the reactor chamber 14a causes the desired uniform spread of the organic liquid waste to the reactor chamber 14a. The foams of oxygen are also uniformly diffused or spread by the uniform spread of the organic liquid waste. This allows supplying sufficient amounts of oxygen and nutrition to the microorganisms on the carriers 15a to realize a uniform oxidation and decomposition of the BOD component with the microorganisms.

The fourth feeding pipe 13 has a diameter adopted to feed the organic liquid waste to the biofilm reactor 14. This diameter is much larger than a diameter of the holes of the above manifolds. It is not possible for the fourth feeding pipe 13 to be blocked with the sludge of the dead microorganisms.

The above-described method of the present invention does not utilize the air-distribution manifolds in the biofilm reactor 14.

2-3: BOD-Decomposing Capacity:

In accordance with the above-described conventional method, the maximum concentration of oxygen dissolved in the organic liquid waste is only approximately 5-6 mg/L. This means that a relatively small amount of oxygen is available for the aerobic microorganisms. Assuming that a removal rate of the BOD component is 90%, 1 $m^3$ of the biofilm decomposes approximately 1-2 kg of the BOD component per day.

In accordance with the above-described method of the present invention, the concentration of oxygen dissolved in the organic liquid waste is higher by approximately five or six times than that obtained by the conventional method. 1 $m^3$ of the biofilm decomposes approximately 3-5 kg of the BOD component per day. This allows a possible size reduction of the biofilm reactor 14.

2-4: Conclusions:

In accordance with the organic liquid waste treatment apparatus 1 of the present invention, the high pressure oxygen dissolving vessel 11 dissolves oxygen in organic liquid waste under high pressure to form pressurized oxygen-dissolved organic liquid waste, which is then fed through the fourth feeding pipe 13 to the biofilm reactor 14. The reactor chamber 14a of the biofilm reactor 14 has an atmospheric pressure that is sufficiently lower than the high pressure of the high pressure oxygen dissolving vessel 11 so that the pressurized oxygen-dissolved organic liquid waste is rapidly depressurized in the reactor chamber 14a. The rapid depressurization decreases a saturation amount of oxygen in the organic liquid waste to generate a supersaturated oxygen component. The supersaturated oxygen component is then naturally vaporized with generating a large amount of highly fine foams of oxygen. The oxygen foams have smaller sizes than the holes 15e of the carriers 15a, whereby the foams enter into the inner space of each carrier 15a. The entered foams supply oxygen to a colony of the microorganisms in the form of the biofilm adhered on the inner wall of each carrier 15a. The other foams adjacent to the outer wall of each carrier 15a supply oxygen to other colonies of the microorganisms in the form of the other biofilm adhered on the outer wall of each carrier 15a. The highly fine foams may also reside in the organic liquid waste for such a long time that a sufficient amount of oxygen can be supplied to a colony of the microorganisms in the form of the biofilm. This allows the microorganisms to exhibit a high performance of oxidizing and decomposing the BOD component.

Proper amounts of phosphorous (P) and nitrogen (N) may be introduced into the adjusting vessel 2 as nutrition for microorganisms in the biofilm reactor 14 to enhance the biological activity of the aerobic microorganisms. The proper amounts are determined so that the microorganisms efficiently oxidize and decompose the organic liquid waste. The biofilm reactor 14 further includes the heater 16 that is configured to heat the biofilm reactor 14 at an optimum temperature to enhance the biological activity of the aerobic microorganisms. The proper amount of nutrition, the optimum temperature adjustment and the sufficient oxygen supply allows the microorganisms to exhibit an enhanced biological activity to oxidize and decompose the BOD component in the organic liquid waste.

The sloped portion 14d of the reactor chamber 14a causes the desired uniform spread of the organic liquid waste to the reactor chamber 14a. The foams of oxygen are also uniformly diffused or spread by the uniform spread of the organic liquid waste. This allows supplying sufficient amounts of oxygen and nutrition to the microorganisms as uniformly as possible to realize uniform oxidation and decomposition of the BOD component with the microorganisms.

3. Modified Embodiments

3-1: First Modified Embodiment

Figure 5:
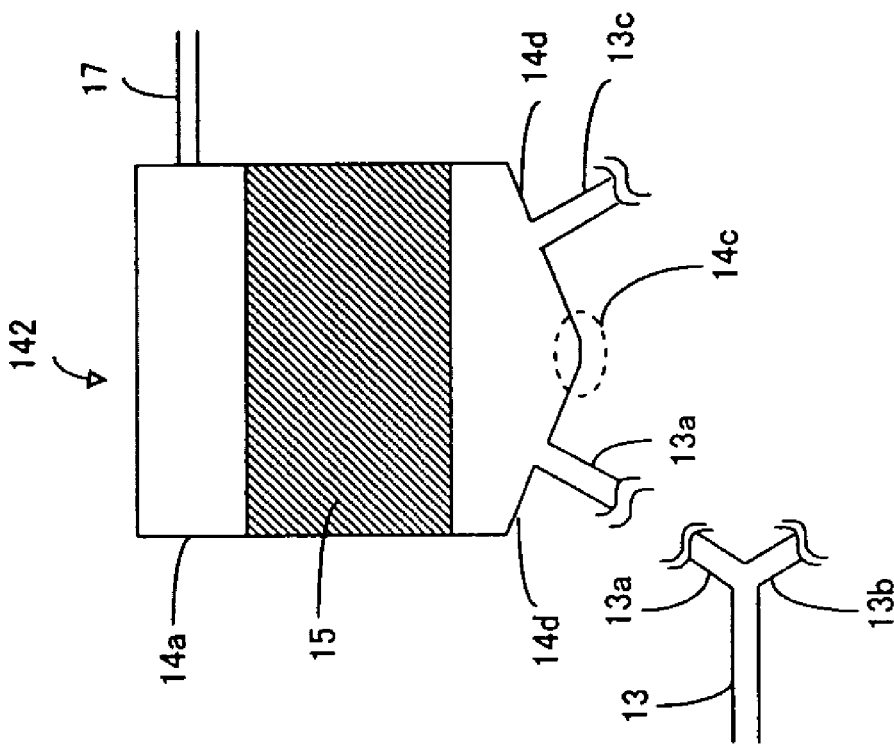
FIG. 5 is a fragmentary cross sectional elevational view illustrating a modified connection structure of a fourth feeding pipe to the biofilm reactor in accordance with a first modified embodiment of the present invention.

FIG. 5 is a fragmentary cross-sectional elevational view illustrating a modified connection structure of the fourth feeding pipe to the biofilm reactor in accordance with the first modified embodiment of the present invention. The organic liquid waste treatment apparatus 1 of the first modified embodiment is identical in structure or, similar to that of the above-described first embodiment, except its main distinguishing feature is a modified connection structure of the fourth feeding pipe 13 to a biofilm reactor 141. Thus, the following description will focus on the modified connection structure of the fourth feeding pipe 13 to a biofilm reactor 141.

The biofilm reactor 141 includes a reactor chamber 14a, a biofilm holder 15, and a heater, in which is not illustrated but can be like the one shown in FIG. 1. The biofilm holder 15 is provided in the reactor chamber 14a to hold the biofilms, each of which has a colony of the aerobic microorganisms. The heater, which can be like the one shown in FIG. 1, is provided adjacent to an outer wall of the reactor chamber 14a to control a temperature of the biofilm reactor 14. The reactor chamber 14a is preferably cylindrically shaped. The reactor chamber 14a also has a flat top, a conical bottom, and a cylindrically shaped side wall. The conical bottom further includes a sloped or tapered portion 14d and a bottom center 14c. The bottom center 14c is further joined with a downstream end of the fourth feeding pipe 13. The downstream end includes an opening that faces upward and adjacent to the bottom center 14c.

The fourth feeding pipe 13 has a branched structure that includes first and second branched pipes 13a and 13b. The first and second branched pipes 13a and 13b extend from a half-way branching portion of the fourth feeding pipe 13 to different positions on the sloped or tapered portion 14d of the conical bottom of the reactor chamber 14a. Therefore, the reactor chamber 14a has an inner space that communicates through the fourth feeding pipe 13 and the first and second branched pipes 13a and 13b to the inner space of the high pressure oxygen dissolving vessel 11 illustrated in FIG. 1. The fourth feeding pipe 13 feeds the organic liquid waste to the bottom center 14c of the reactor chamber 14a. The first and second branched pipes 13a and 13b feed the organic liquid waste to the sloped or tapered portion 14d of the conical bottom of the reactor chamber 14a. It is preferable that the first and second branched pipes 13a and 13b have respective downstream ends, which are positioned symmetrically with reference to the bottom center 14c of the reactor chamber 14a. These symmetrical three-way feeding paths allow uniform and rapid feeding of the organic liquid waste into the reactor chamber 14a.

The organic liquid waste treatment apparatus 1 of the first modified embodiment provides the same or similar effects and advantages as those of the above-described first embodiments.

It is also possible as a further modification that further branched pipes are provided in addition to the first and second branched pipes 13a and 13b. It is preferable that the branched pipes extend symmetrically with reference to the bottom center 14c of the reactor chamber 14a.

3-2: Second Modified Embodiment

Figure 6:
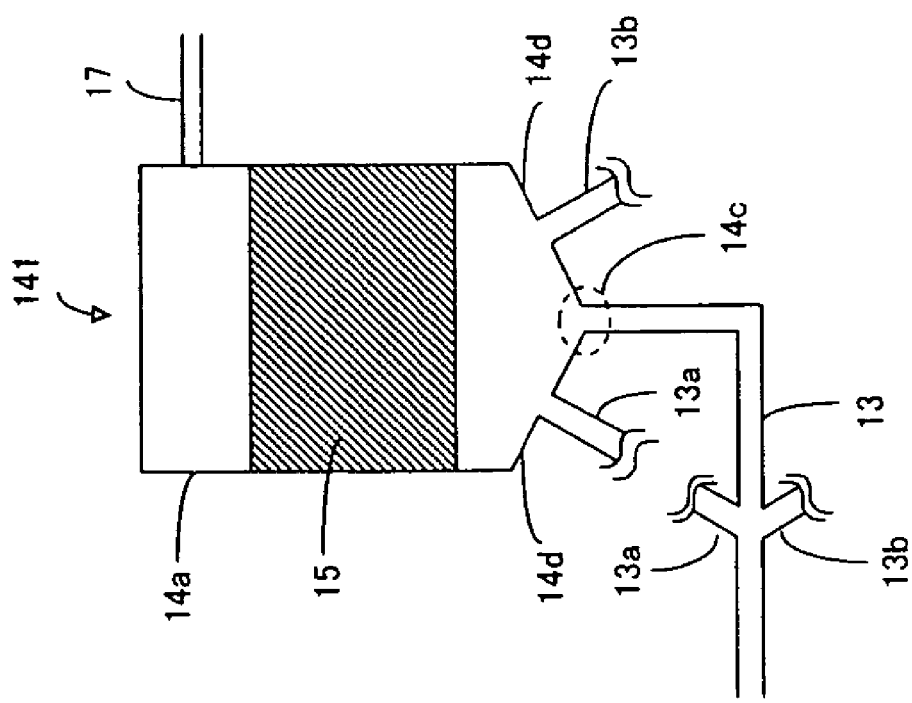
FIG. 6 is a fragmentary cross sectional elevational view illustrating a modified connection structure of the fourth feeding pipe to the biofilm reactor in accordance with a second modified embodiment of the present invention.

FIG. 6 is a fragmentary cross-sectional elevational view illustrating a modified connection structure of the fourth feeding pipe 13 to a biofilm reactor 142 in accordance with a second modified embodiment of the present invention. The organic liquid waste treatment apparatus 1 of the second modified embodiment is identical in structure or similar to that of the above-described first embodiment, except for its main distinguishing feature being a modified connection structure of the fourth feeding pipe 13 to the biofilm reactor 142. The following descriptions will focus on the modified connection structure of the fourth feeding pipe 13 to a biofilm reactor 142.

The biofilm reactor 142 includes a reactor chamber 14a, a biofilm holder 15, and a heater, which is not illustrated but can be like the one shown in FIG. 1. The biofilm holder 15 is provided in the reactor chamber 14a to hold the biofilms, each of which has a colony of the aerobic microorganisms. The heater is preferably provided adjacent to an outer wall of the reactor chamber 14a to control a temperature of the biofilm reactor 14. The reactor chamber 14a is preferably cylindrically shaped. The reactor chamber 14a also has a flat top, a conical bottom, and a cylindrically shaped side wall. The conical bottom further has a sloped or tapered portion 14d and a bottom center 14c. The bottom center 14c is closed. The fourth feeding pipe 13 has a Y-branched downstream end which joint with first and second branched pipes 13a and 13b. The first and second branched pipes 13a and 13b extend from the Y-branched downstream end of the fourth feeding pipe 13 to different positions on the sloped or tapered portion 14d of the conical bottom of the reactor chamber 14a. Therefore, the reactor chamber 14a has an inner space that communicates through the fourth feeding pipe 13 and the first and second branched pipes 13a and 13b to the inner space of the high pressure oxygen dissolving vessel 11 illustrated in FIG. 1. The first and second branched pipes 13a and 13b feed the organic liquid waste to the sloped or tapered portion 14d of the conical bottom of the reactor chamber 14a. It is preferable that the first and second branched pipes 13a and 13b have respective downstream ends, which are positioned symmetrically with reference to the bottom center 14c of the reactor chamber 14a. These symmetrical two-way feeding paths allow uniform and rapid feeding of the organic liquid waste into the reactor chamber 14a.

The organic liquid waste treatment apparatus 1 of the second modified embodiment provides the same or similar effects and advantages as those of the above-described first embodiments.

It is also possible as a further modification that further branched pipes are provided in addition to the first and second branched pipes 13a and 13b. It is preferable that the branched pipes extend symmetrically with reference to the bottom center 14c of the reactor chamber 14a.

3-3: Third Modified Embodiment

Figure 7:
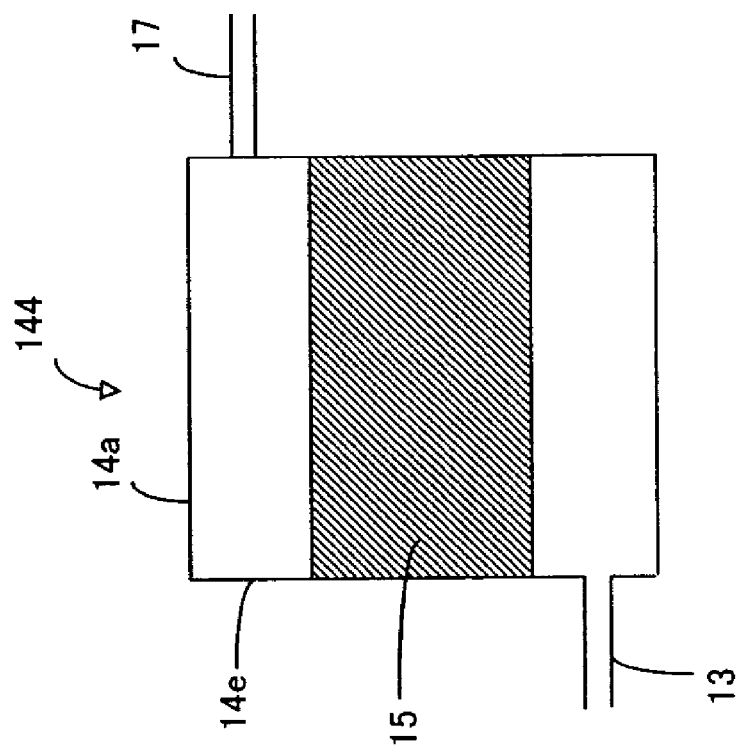
FIG. 7 is a fragmentary cross-sectional elevational view illustrating a modified biofilm reactor in accordance with a third modified embodiment of the present invention.

FIG. 7 is a fragmentary cross-sectional elevational view illustrating a modified biofilm reactor in accordance with a third modified embodiment of the present invention. The organic liquid waste treatment apparatus 1 of the third modified embodiment is identical in structure or similar to that of the above-described first embodiment, except its main distinguishing feature is a modified biofilm reactor 143. The following description will focus on the modified biofilm reactor 143.

The biofilm reactor 143 includes a reactor chamber 14a, a biofilm holder 15, and a heater, which is not illustrated but can be like the one shown in FIG. 1. The biofilm holder 15 is provided in the reactor chamber 14a to hold the biofilms, each of which includes a colony of the aerobic microorganisms. The heater is provided adjacent to an outer wall of the reactor chamber 14a to control a temperature of the biofilm reactor 14. The reactor chamber 14a is preferably cylindrically shaped. The reactor chamber 14a also has flat top and bottom, and a cylindrically shaped side wall. The flat bottom has a bottom center 14c further joined with a downstream end of the fourth feeding pipe 13. The downstream end has an opening that faces upward and adjacent to the bottom center 14c. Therefore, the reactor chamber 14a has an inner space that communicates through the fourth feeding pipe 13 to the inner space of the high pressure oxygen dissolving vessel 11 illustrated in FIG. 1. The fourth feeding pipe 13 feeds the organic liquid waste to the bottom center 14c of the reactor chamber 14a.

The organic liquid waste treatment apparatus 1 of the third modified embodiment provides almost the same effects and advantages as those of the above-described first embodiments.

3-4: Fourth Modified Embodiment

Figure 8:
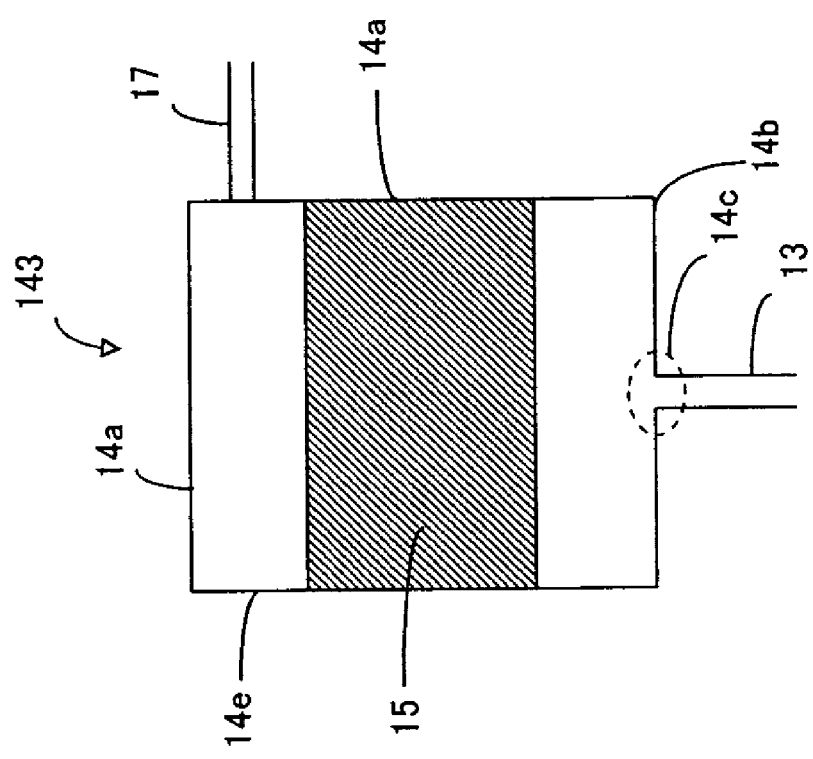
FIG. 8 is a fragmentary cross sectional elevation view illustrative of a modified biofilm reactor in accordance with a fourth modified embodiment of the present invention.

FIG. 8 is a fragmentary cross-sectional elevational view illustrating a modified biofilm reactor in accordance with a fourth modified embodiment of the present invention. The organic liquid waste treatment apparatus 1 of the fourth modified embodiment is identical in structure or similar to that of the above-described first embodiment, except its main distinguishing feature is a modified biofilm reactor 144. The following description will focus on the modified biofilm reactor 144.

The biofilm reactor 144 includes a reactor chamber 14a, a biofilm holder 15, and a heater which is not illustrated but can be like the one shown in FIG. 1. The biofilm holder 15 is provided in the reactor chamber 14a to hold the biofilms, each of which has a colony of the aerobic microorganisms. The heater is provided adjacent to an outer wall of the reactor chamber 14a to control a temperature of the biofilm reactor 14. The reactor chamber 14a is preferably cylindrically shaped. The reactor chamber 14a also has flat top and bottom, and a cylindrically shaped side wall. The cylindrically shaped side wall further includes a lower portion positioned below the biofilm holder 15. The lower portion of the cylindrically shaped side wall is joined with a downstream end of the fourth feeding pipe 13. The downstream end has an opening which faces to a horizontal direction. Therefore, the reactor chamber 14a has an inner space that communicates through the fourth feeding pipe 13 to the inner space of the high pressure oxygen dissolving vessel 11 illustrated in FIG. 1. The fourth feeding pipe 13 feeds the organic liquid waste to the bottom center 14c of the reactor chamber 14a.

The organic liquid waste treatment apparatus 1 of the fourth modified embodiment provides almost the same effects and advantages as those of the above-described first embodiments.

3-5: Fifth Modified Embodiment

In the above-described embodiments, the biofilm reactor 14 is preferably heated with the heater 16 shown in FIG. 1. Instead of the heater 16, any other available measures for heating the biofilm reactor 14 may be used solely or in combination. Typical examples of the other heating measures may include, but is not limited to, a heat exchanger, use of hot water and injection of hot water.

3-6: Sixth Modified Embodiment

Figure 9:
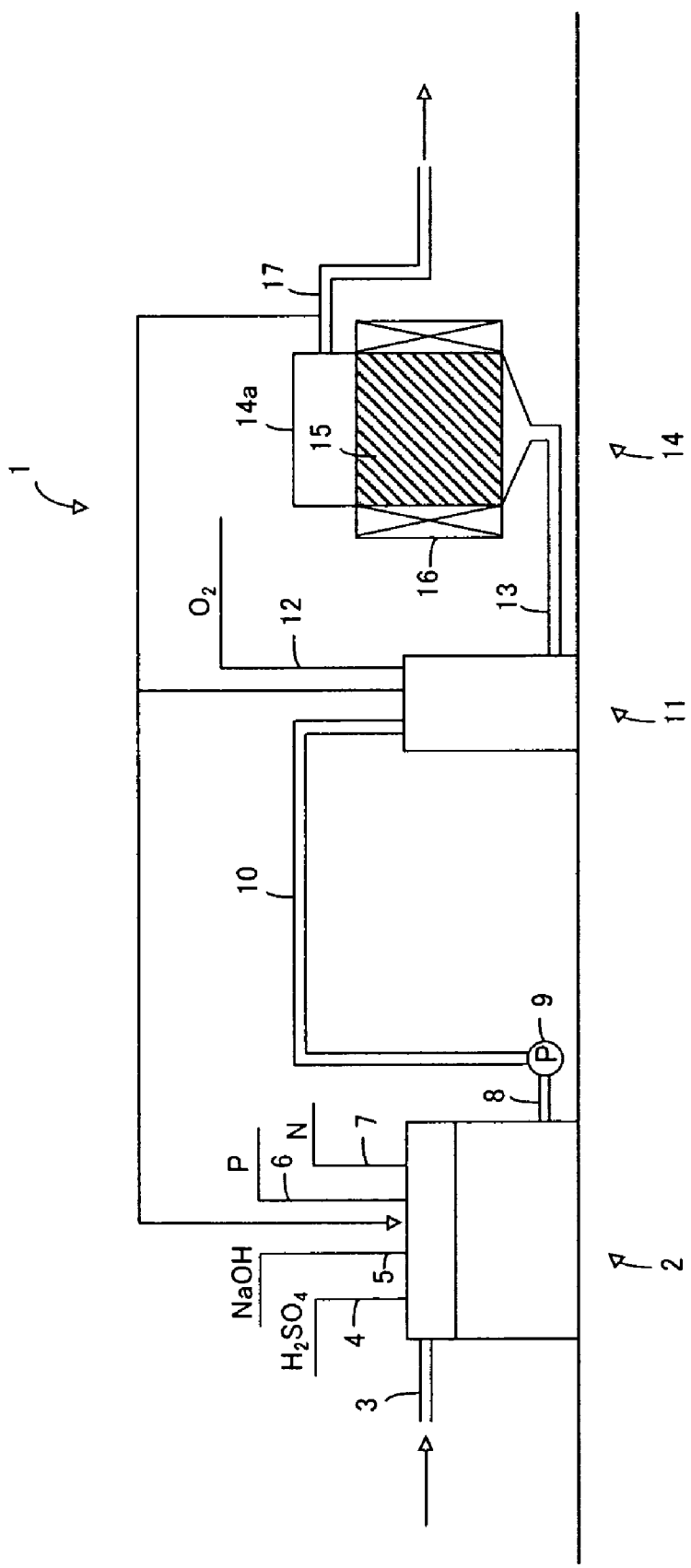
FIG. 9 is a view of a schematic diagram illustrating a configuration of an organic liquid waste treatment apparatus in accordance with a sixth modified embodiment of the present invention.

FIG. 9 is a schematic diagram illustrating a configuration of an organic liquid waste treatment apparatus 1 in accordance with a sixth modified embodiment of the present invention. The organic liquid waste treatment apparatus 1 of the sixth modified embodiment is identical or similar to the above-described organic liquid waste treatment apparatus 1 of the first embodiment, except its main distinguishing feature is the following described circulation system. The circulation system is configured to circulate the pressurized oxygen-dissolved organic liquid waste in the high pressure oxygen dissolving vessel 11 to the adjusting vessel 2. The circulation system is also configured to circulate the treated organic liquid waste in the biofilm reactor 14 to the adjusting vessel 2. These circulations of the pressurized oxygen-dissolved organic liquid waste and the treated organic liquid waste to the adjusting vessel 2 result in an increase in oxygen-concentration of the organic liquid waste in the adjusting vessel 2. This causes an increase in the concentration of oxygen dissolved in the organic liquid waste that is subject to the decomposition with the aerobic microorganisms.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An organic liquid waste treatment apparatus comprising:
   a dissolving mechanism being configured to dissolve organic liquid waste with oxygen under a first pressure higher than atmospheric pressure and, to prepare a pressurized oxygen-dissolved organic liquid waste; and
   a reactor being mechanically coupled to said dissolving mechanism to receive said pressurized oxygen-dissolved organic liquid waste from first dissolving mechanism, said reactor having a biofilm, said reactor being configured to depressurize said pressurized oxygen-dissolved organic liquid waste to prepare a depressurized oxygen-dissolved organic liquid waste, and said reactor being also configured to make said depressurized oxygen-dissolved organic liquid waste contact said biofilm to prepare a treated organic liquid waste.

2. The organic liquid waste treatment apparatus according to claim 1, wherein said reactor has a second pressure that is lower than said first pressure to depressurize said pressurized oxygen-dissolved organic liquid waste.

3. The organic liquid waste treatment apparatus according to claim 1, further comprising,
a first feeding system that is mechanically coupled with said dissolving mechanism to feed a pressurized oxygen-containing gas to said dissolving mechanism.

4. The organic liquid waste treatment apparatus according to claim 1, further comprising,
a second feeding system that is mechanically coupled with said dissolving mechanism to feed said organic liquid waste to said first dissolving mechanism.

5. The organic liquid waste treatment apparatus according to claim 4, wherein
said second feeding system further comprises a pressuring device that pressures said organic liquid waste.

6. The organic liquid waste treatment apparatus according to claim 4, further comprising,
an adjusting mechanism configured to adjust a pH-value of said organic liquid waste, and supply said organic liquid waste with a nutrition for said biofilm, said adjusting mechanism prepares a pH-adjusted nutrition-containing organic liquid waste, and
said adjusting mechanism being mechanically coupled through said second feeding system to said dissolving mechanism to feed said pH-adjusted nutrition-containing organic liquid waste through said second feeding system to said dissolving mechanism.

7. The organic liquid waste treatment apparatus according to claim 1, further comprising,
a third feeding system that is mechanically coupling said dissolving mechanism to said reactor to feed said pressurized oxygen-dissolved organic liquid waste from said dissolving mechanism to said first reactor.

8. The organic liquid waste treatment apparatus according to claim 7, further comprising,
a fourth feeding system that is mechanically coupled with said reactor to discharge said treated organic liquid waste.

9. The organic liquid waste treatment apparatus according to claim 8, wherein said first reactor further comprises,
a holder to hold said biofilm.

10. The organic liquid waste treatment apparatus according to claim 9, wherein said first reactor further comprises,
a lower part positioned below said holder, and said lower part is coupled with said third feeding system, and
an upper part positioned above first holder, and said upper part is coupled with said fourth feeding system.

11. The organic liquid waste treatment apparatus according to claim 10, wherein said third feeding system further comprises,
a pipe having a downstream end that is connected with a bottom center of said lower part, and said downstream end has an opening that faces upwardly.

12. The organic liquid waste treatment apparatus according to claim 10, wherein
said lower part further comprises a conical bottom that has a sloped portion and a bottom center.

13. The organic liquid waste treatment apparatus according to claim 12, wherein
said bottom center is mechanically coupled with said third feeding system.

14. The organic liquid waste treatment apparatus according to claim 12, wherein
said sloped portion is mechanically coupled with said third feeding system.

15. The organic liquid waste treatment apparatus according to claim 12, wherein
said sloped portion and said bottom center are mechanically coupled with said third feeding system.

16. The organic liquid waste treatment apparatus according to claim 12, wherein
said sloped portion has a first slope angle from a horizontal direction, and said first slope angle is determined with reference to a horizontally sectioned area of said reactor.

17. The organic liquid waste treatment apparatus according to claim 9, wherein said first holder further comprises,
at least one carrier that supports said biofilm, and
a confining structure provided in said first reactor to confine said at least one carrier.

18. The organic liquid waste treatment apparatus according to claim 17, wherein
said at least one carrier has at least one hole and outer and inner walls, and each of said outer and inner walls supports said biofilm.

19. The organic liquid waste treatment apparatus according to claim 17, wherein
said confining structure further comprises, a pair of first and second meshed plates vertically distanced from each other.

20. The organic liquid waste treatment apparatus according to claim 1, further comprising,
a temperature-adjuster configured to adjust a temperature of said depressurized oxygen-dissolved organic liquid waste in said first reactor.

21. An organic liquid waste treatment method comprising:
dissolving an organic liquid waste with oxygen under a first pressure higher than atmospheric pressure to prepare a pressurized oxygen-dissolved organic liquid waste;
depressurizing said pressurized oxygen-dissolved organic liquid waste to prepare a depressurized oxygen-dissolved organic liquid waste; and
contacting said depressurized oxygen-dissolved organic liquid waste with a biofilm to prepare a treated organic liquid waste.

22. The organic liquid waste treatment method of claim 21, wherein said depressurizing further comprises introducing said pressurized oxygen-dissolved organic liquid waste into a first reactor that has a second pressure that is lower than said first pressure.

23. The organic liquid waste treatment method of claim 22, wherein said contacting further comprises generating a flow of said depressurized oxygen-dissolved organic liquid waste through a first holder that holds said biofilm in said first reactor.

24. The organic liquid waste treatment method of claim 23, further comprising,
discharging said treated organic liquid waste from an upper part of said first reactor, said upper part being positioned above said first holder, and
introducing said pressurized oxygen-dissolved organic liquid waste comprises feeding said pressurized oxygen-dissolved organic liquid waste into a conical bottom of said first reactor, said conical bottom being positioned below said first holder, and said conical bottom having a bottom center and a sloped portion.

25. The organic liquid waste treatment method of claim 24, wherein said introducing said pressurized oxygen-dissolved organic liquid waste comprises feeding said pressurized oxygen-dissolved organic liquid waste into at least one of said bottom center and said sloped portion.

26. the organic liquid waste treatment method of claim 21, wherein said dissolving further comprises supplying said organic liquid waste with a pressurized oxygen-containing gas.

27. The organic liquid waste treatment method of claim 21, further comprising, pressuring said organic liquid waste prior to dissolving said organic liquid waste.

28. The organic liquid waste treatment method of claim 21, further comprising,
adjusting a pH-value of said organic liquid waste and supplying said organic liquid waste with a nutrition for said biofilm to prepare a pH-adjusted nutrition-containing organic liquid waste prior to dissolving said organic liquid waste.

29. The organic liquid waste treatment method of claim 21, further comprising,
adjusting a temperature of said depressurized oxygen-dissolved organic liquid waste while contacting said depressurized oxygen-dissolved organic liquid waste.

* * * * *